(12) United States Patent
 Igarashi

(10) Patent No.: US 12,647,046 B2
(45) Date of Patent: Jun. 2, 2026

(54) POWER CONVERTER CIRCUIT AND SEMICONDUCTOR MODULE

(71) Applicant: FUJI ELECTRIC CO., LTD., Kawasaki (JP)

(72) Inventor: Seiki Igarashi, Saitama-City (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 190 days.

(21) Appl. No.: 18/422,751

(22) Filed: Jan. 25, 2024

(65) Prior Publication Data

US 2024/0297596 A1 Sep. 5, 2024

(30) Foreign Application Priority Data

Mar. 3, 2023 (JP) ................................. 2023-032583

(51) Int. Cl.
 *H02M 7/5387* (2007.01)
 *H02M 7/48* (2007.01)
(52) U.S. Cl.
 CPC ..... *H02M 7/53871* (2013.01); *H02M 7/4815* (2021.05)
(58) Field of Classification Search
 CPC .. H02M 7/4815; H02M 7/487; H02M 7/5387; H02M 7/5388; H02M 1/12
 See application file for complete search history.

(56) References Cited

U.S. PATENT DOCUMENTS

| | | | | |
|---|---|---|---|---|
| 11,527,950 B2 * | 12/2022 | Hall | ........................ | H03K 17/13 |
| 2014/0185346 A1 * | 7/2014 | Liu | ........................ | H03K 17/127 |
| | | | | 257/77 |
| 2016/0352253 A1 * | 12/2016 | Liu | .................... | H02M 7/53871 |
| 2020/0313539 A1 * | 10/2020 | Hall | .................... | H02M 1/4233 |

FOREIGN PATENT DOCUMENTS

| | | | | | |
|---|---|---|---|---|---|
| CN | 207691703 U | * | 8/2018 | | |
| CN | 113162452 A | * | 7/2021 | ............ | H02M 7/537 |
| JP | 2012-135160 A | | 7/2012 | | |

OTHER PUBLICATIONS

Machine translation CN207691703 (Year: 2018).*
J. Burm et al., entitled "Wide Band-Gap FETs for High Power Amplifiers," Journal of Semiconductor Technology and Science, vol. 6 , No. 3, pp. 175-182, Sep. 2006 (Year: 2006).*
Machine Translation CN_113162452 (Year: 2021).*

* cited by examiner

*Primary Examiner* — Thienvu V Tran
*Assistant Examiner* — Yahveh Comas Torres
(74) *Attorney, Agent, or Firm* — Rabin & Berdo, P.C.

(57) ABSTRACT

A power converter circuit includes: a first switching device connected to a first line on a positive voltage side; a first diode having a cathode connected to the first switching device and an anode connected to a second line on a negative voltage side; a second diode having a cathode connected to the first line; a second switching device connected to an anode of the second diode and the second line; a first coil and a second coil connected in series between a first node, at which the first switching device and the first diode are connected, and a second node, at which the second switching device and the second diode are connected; and a first capacitor connected between a third node, at which the first coil and the second coil are connected, and a third line.

8 Claims, 9 Drawing Sheets

POWER CONVERTER CIRCUIT AND SEMICONDUCTOR MODULE

CROSS-REFERENCE TO RELATED APPLICATIONS

The present application claims priority pursuant to 35 U.S.C. § 119 from Japanese patent application number 2023-032583 filed on Mar. 3, 2023, the entire disclosure of which is hereby incorporated by reference herein.

BACKGROUND

Technical Field

The present disclosure relates to a power converter circuit and a semiconductor module.

Description of the Related Art

In a typical voltage-fed three-phase PWM inverter, one leg has a switching device (e.g., insulated gate bipolar transistor (IGBT)) in each of an upper arm and a lower arm.

In this configuration, when such switching devices of the upper arm and the lower arm are turned on concurrently, a through current flows from the high potential side to the low potential side. Thus, it is needed to provide a dead time such that the switching devices of the upper arm and the lower arm are not concurrently ON (for example, Japanese Patent Application Publication No. 2012-135160).

However, when the dead time is provided, the waveform of the output voltage of the three-phase PWM inverter may be greatly distorted according to the current flowing through a load.

SUMMARY

A first aspect of the present disclosure is a power converter circuit comprising: a first line on a positive voltage side of the power converter circuit; a second line on a negative voltage side of the power converter circuit; a third line; a first switching device connected to the first line; a first diode having a cathode connected to the first switching device and an anode connected to the second line; a second diode having a cathode connected to the first line; a second switching device connected to an anode of the second diode and the second line; a first coil and a second coil connected in series between a first node, at which the first switching device and the first diode are connected, and a second node, at which the second switching device and the second diode are connected; and a first capacitor connected between a third node, at which the first coil and the second coil are connected, and the third line.

A second aspect of the present disclosure is a semiconductor module comprising: a first line on a positive voltage side of the power converter circuit; a second line on a negative voltage side of the power converter circuit; a first switching device connected to the first line; a first diode having a cathode connected to the first switching device and an anode connected to the second line; a second diode having a cathode connected to the first line; a second switching device connected to an anode of the second diode and the second line; a first terminal to which the first line is connected, a second terminal to which the second line is connected, a third terminal to which a first node, at which the first switching device and the first diode are connected, is connected; and a fourth terminal to which a second node, at which the second switching device and the second diode are connected, is connected, wherein the third terminal and the fourth terminal are configured for a first coil and a second coil, connected in series and having a first capacitor connected to a node at which the first coil and the second coil are connected, to be connected between the third and fourth terminals.

DETAILED DESCRIPTION

Figure 1:
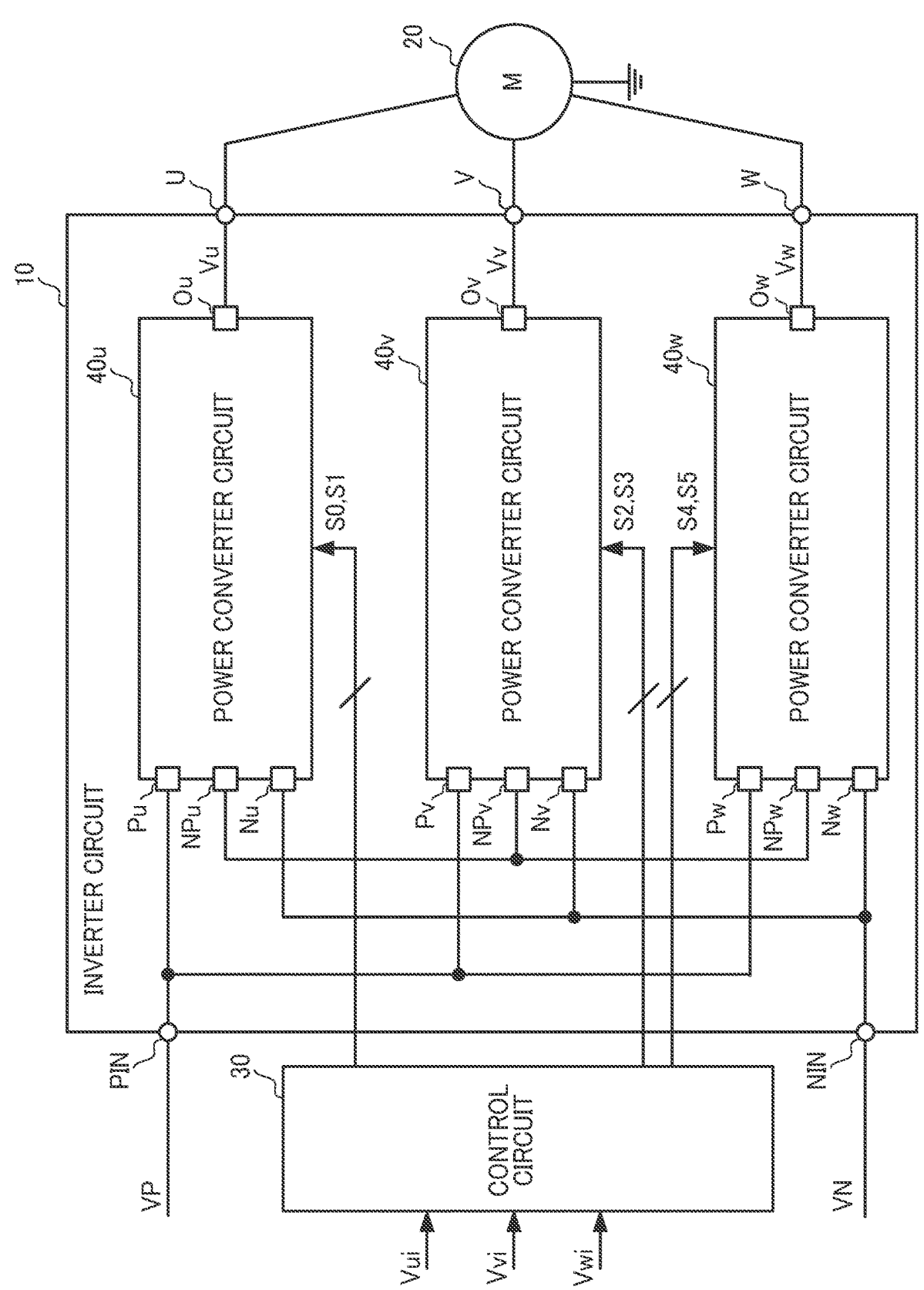
FIG. 1 is a diagram illustrating a configuration example of an inverter circuit 10.

At least following matters will become apparent from the descriptions of the present description and the accompanying drawings.

Hereinafter, embodiments of the present disclosure will be described with reference to the drawings. The same or equivalent constituent elements, members, and the like illustrated in the drawings are given the same reference numerals, and repetitive description is omitted as appropriate.

Embodiments

<<Inverter Circuit 10>>

FIG. 1 is a diagram illustrating a configuration example of an inverter circuit 10. The inverter circuit 10 is a circuit to output three-phase alternating current (AC) voltages Vu, Vv, Vw, to drive a motor 20, based on a voltage VP and a voltage VN. Note that the phases of the three phase AC voltages Vu, Vv, Vw are shifted by 120 degrees from one another.

Further, the inverter circuit 10 has a terminal PIN for receiving the voltage VP of a power supply voltage, a terminal NIN for receiving a voltage VN (e.g., negative voltage) lower than the voltage VP, a terminal U for outputting the voltage Vu, a terminal V for outputting the voltage Vv, and a terminal W for outputting the voltage Vw. The inverter circuit 10 includes three power converter circuits 40u, 40v, 40w, which will be described later in detail.

The motor 20 is a load to operate based on the three phase AC voltages Vu, Vv, Vw from the inverter circuit 10.

The control circuit 30 outputs control signals S0 to S5, based on output voltage commands Vui, Vvi, Vwi outputted from a microcomputer (not illustrated), to thereby control the power converter circuits 40u, 40v, 40w. Specifically, the control circuit 30 outputs the control signals S0, S1 such that the voltage Vu changes according to the output voltage command Vui, based on the output voltage command Vui. Further, the control circuit 30 outputs the control signals S0 to S5, based on the output voltage commands Vui, Vvi, Vwi such that the three-phase AC voltages Vu, Vv, Vw will be sinusoidal three-phase AC voltages having a phase shift of 120 degrees from one another.

Further, the power converter circuit 40u is controlled by the control signals S0, S1 that change such that the logic levels thereof are different from each other, and converts the voltage VP and the voltage VN into the voltage Vu, which will be described later in detail. Further, the power converter circuit 40u has a terminal Pu for receiving the voltage VP, a terminal Nu for receiving the voltage VN, and a terminal NPu connected to a neutral point, and a terminal Ou for outputting the voltage Vu. Note that the power converter circuit 40u has terminals for receiving the control signals S0, S1, but they are not illustrated, for convenience.

Similarly, the power converter circuit 40v is controlled by the control signals S2, S3 that change such that the logic levels thereof are different from each other, and converts the voltage VP and the voltage VN into the voltage Vv. In addition, the power converter circuit 40v has a terminal Pv for receiving the voltage VP, a terminal Nv for receiving the voltage VN, a terminal NPv connected to the neutral point, and a terminal Ov for outputting the voltage Vv. Note that the power converter circuit 40v has terminals for receiving the control signals S2, S3, but they are not illustrated, for convenience.

Furthermore, the power converter circuit 40w is controlled by the control signals S4, S5 that change such that the logic levels thereof are different from each other, and converts the voltage VP and the voltage VN into the voltage Vw. In addition, the power converter circuit 40w has a terminal Pw for receiving the voltage VP, a terminal Nw for receiving the voltage VN, a terminal NPw connected to the neutral point, and a terminal Ow for outputting the voltage Vw. Note the power converter circuit 40w has terminals for receiving the control signals S4, S5, but they are not illustrated, for convenience.

<<<Power Converter Circuit 40u>>>

==Configuration of Power Converter Circuit 40u==

Figure 2:
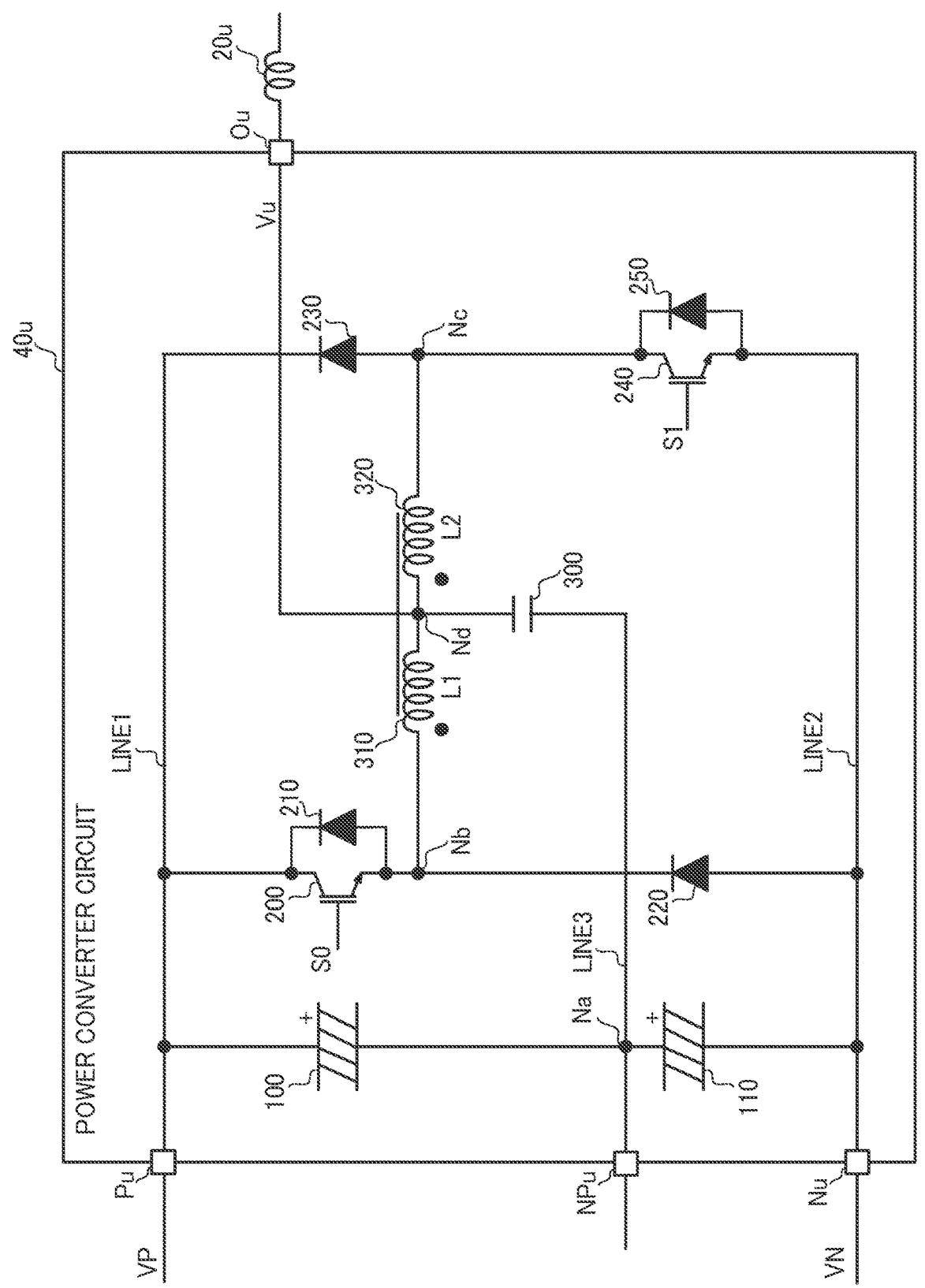
FIG. 2 is a diagram illustrating a configuration example of a voltage converter circuit 40u.

FIG. 2 is a diagram illustrating a configuration example of the voltage converter circuit 40u. The power converter circuit 40u includes electrolytic capacitors 100, 110, insulated gate bipolar transistors (IGBTs) 200, 240, diodes 210, 220, 230, 250, a capacitor 300, and coils 310, 320. Note that in an embodiment of the present disclosure, the coils 310, 320 configure a transformer, and the number and direction of turns thereof are the same. Further, a motor coil 20u of the motor 20 is connected to the terminal Ou.

<<<<Electrolytic Capacitors 100, 110>>>>

The electrolytic capacitors 100, 110 are connected in series between a line LINE1 connected to the terminal Pu (e.g., on the positive voltage side) and a line LINE2 connected to the terminal Nu (e.g., on the negative voltage side), so as to receive the voltages VP and VN. Specifically, the electrolytic capacitor 100 is connected to the line LINE1, and the electrolytic capacitor 110 is connected in series with the electrolytic capacitor 100 and connected to the line LINE2. Note that a connection node Na at which the electrolytic capacitors 100, 110 are connected serves as a neutral point and is connected to the terminal NPu. Further, the electrolytic capacitor 100 corresponds to a "second capacitor", the electrolytic capacitor 110 corresponds to a "third capacitor", the line LINE1 corresponds to a "first line", and the line LINE2 corresponds to a "second capacitor".

<<<<IGBT 200 and Diodes 210, 220>>>>

The IGBT 200 is a switching device configured to be turned on/off in response to the control signal S0, and connected to the line LINE1. Further, the diode 210 is connected in antiparallel with the IGBT 200. The diode 220 is an element to block a current flowing from the line LINE1 to the line LINE2 when the IGBT 200 is on, and has a cathode connected to the IGBT 200 and an anode connected to the line LINE2. Note that the IGBT 200 corresponds to a "first switching device", and the diode 220 corresponds to a "first diode".

<<<<IGBT 240 and Diodes 230, 250>>>>

The diode 230 is an element to block a current flowing from the line LINE1 to the line LINE2 when IGBT 240 is on, and has a cathode connected to the line LINE1. Further, the IGBT 240 is a switching device configured to be turned on/off in response to the control signal S1, and is connected to the anode of the diode 230 and the line LINE2. Further, the diode 250 is connected in antiparallel with the IGBT 240. Note that the diode 230 corresponds to a "second diode," and the IGBT 240 corresponds to a "second switching device".

<<<<Capacitor 300 and Coils 310, 320>>>>

The capacitor 300 is an element to generate the voltage Vu, and is connected between a node Nd, to which the coils 310, 320 are connected, and a line LINE3 connected to the node Na. The coils 310, 320 are elements configured as a transformer in which the coil 310 is used as a primary winding and the coil 320 is used as a secondary winding so as to maintain connectivity between the current flowing through the coil 310 and the current flowing through the coil 320. Further, the number of turns of the coil 310 is equal to that of the coil 320.

The coils 310, 320 are connected in series between a node Nb, at which the IGBT 200 and the diode 220 are connected, and a node Nc, at which the diode 230 and IGBT 240 are connected. Note that the capacitor 300 corresponds to a "first capacitor," the coil 310 corresponds to a "first coil", the coil 320 corresponds to a "second coil", and the line LINE3 corresponds to a "third line". Further, the node Nb corresponds to a "first node," the node Nc corresponds to a "second node," and the node Nd corresponds to a "third node".

In response to the IGBT 200 being turned on and the IGBT 240 being turned off, the capacitor 300 is charged with the current flowing through the coil 310, and the voltage Vu rises, which will be described later in detail. Meanwhile, in response to the IGBT 200 being turned off and the IGBT 240 being turned on, the capacitor 300 is discharged by the current flowing through the coil 320, and the voltage Vu drops.

==Operation of Power Converter Circuit 40u==

Figure 3:
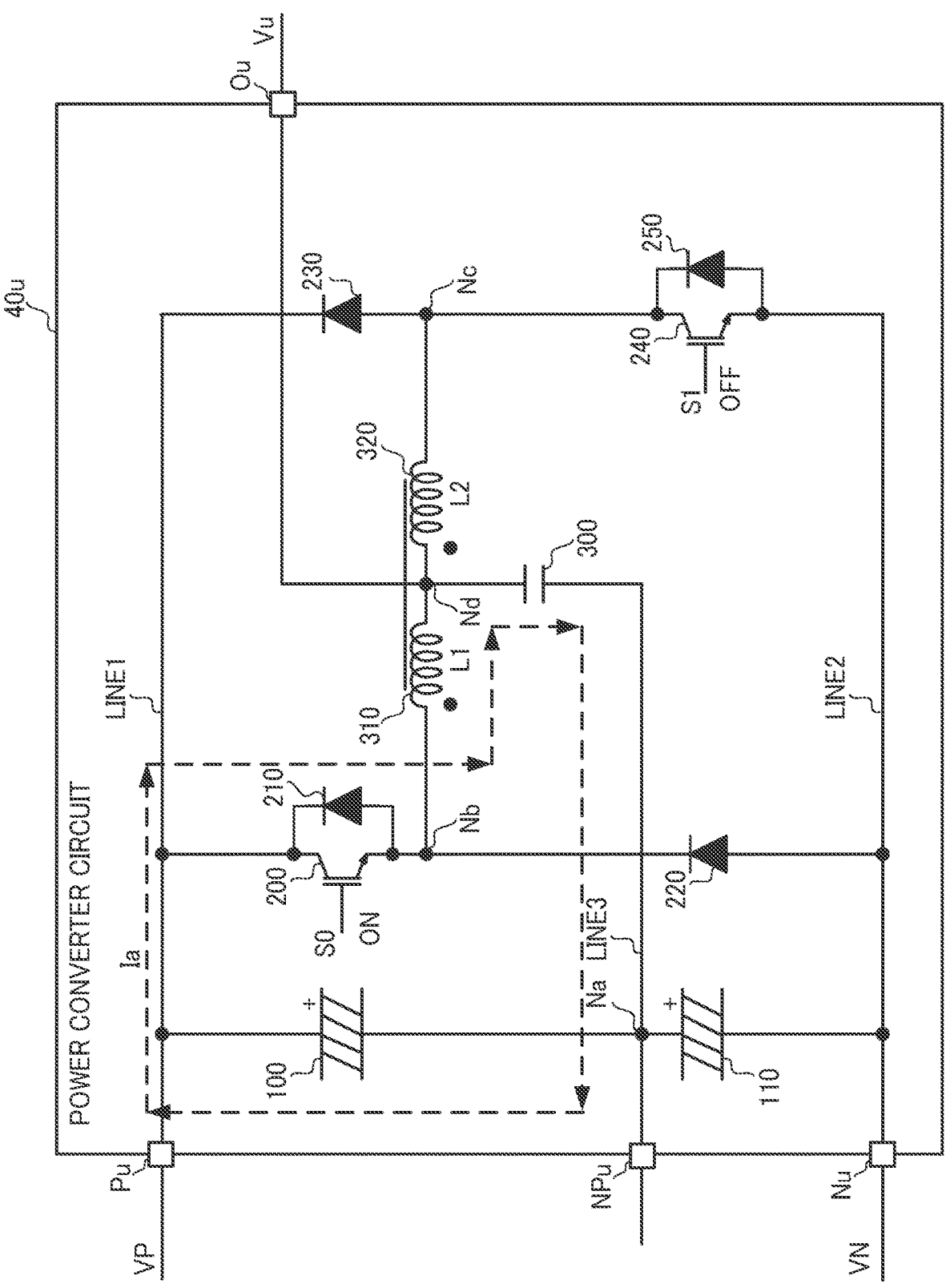
FIG. 3 is a diagram illustrating an example of a current path of a power converter circuit 40u when a capacitor 300 is charged.
Figure 4:
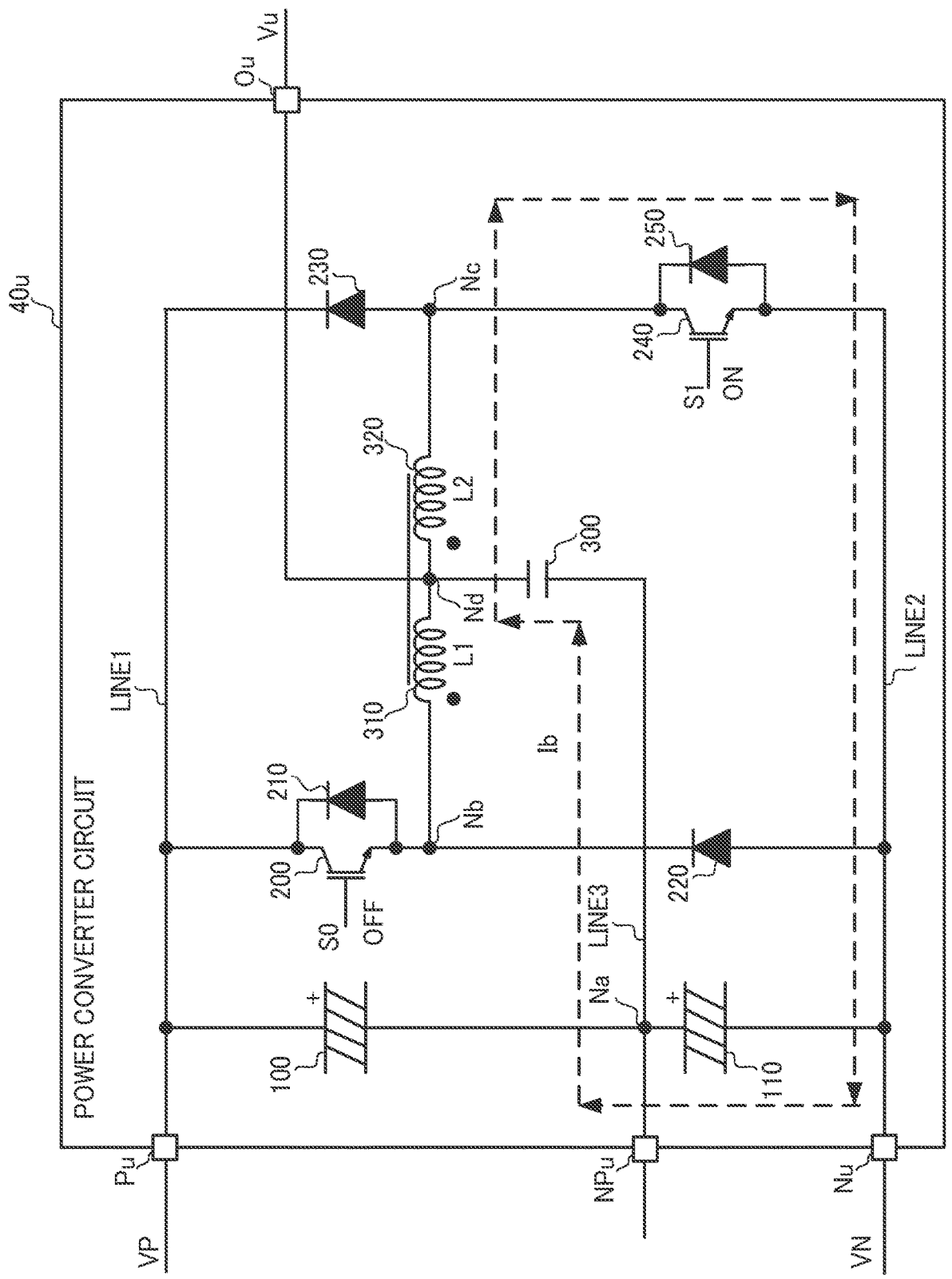
FIG. 4 is a diagram illustrating an example of a current path of a power converter circuit 40u when a capacitor 300 is discharged.
Figure 5:
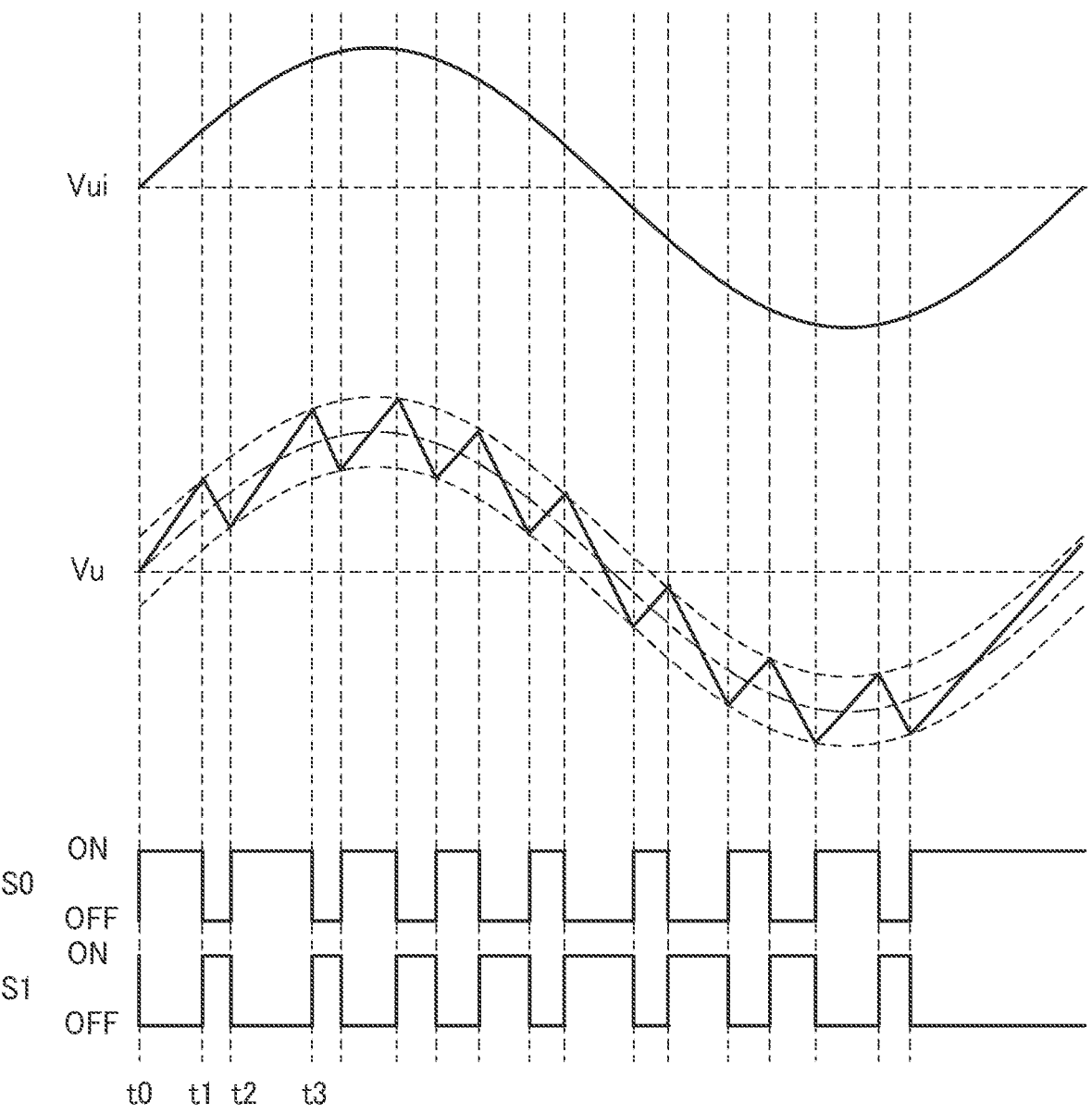
FIG. 5 is a diagram illustrating an example of an output voltage Vu of a power converter circuit 40u.

FIG. 3 is a diagram illustrating an example of a current path of the power converter circuit 40u when the capacitor 300 is charged. FIG. 4 is a diagram illustrating an example of a current path of the power converter circuit 40u when the capacitor 300 is discharged. FIG. 5 is a diagram illustrating an example of the output voltage Vu of the power converter circuit 40u. The following describes how the voltage Vu changes, while describing a path of the current flowing in the power converter circuit 40*u* in response to turning on/off of the IGBTs 200, 240.

At time t0 in FIG. 5, the control circuit 30 causes the control signal S0 to go high and the control signal S1 to go low, and in response to the IGBT 200 being turned on, the current Ia flows through the IGBT 200 and the coil 310 to the capacitor 300, as given by the dashed line in FIG. 3 as one path. Accordingly, the capacitor 300 is charged, and the voltage Vu rises as illustrated in FIG. 5. Then, the current Ia flows through the capacitor 300 and then returns through the electrolytic capacitor 100.

As such, in response to the IGBT 200 being turned on, the current Ia flows so as to charge the capacitor 300, and the voltage Vu rises with a slope based on an inductance value L1 of the coil 310.

Meanwhile, since the IGBT 240 is off, the capacitor 300 is not discharged or the voltage Vu does not drop.

At time t1 in FIG. 5, in response to the voltage Vu rising in accordance with the output voltage command Vui, the control circuit 30 causes the control signal S0 to go low, the control signal S1 to go high, the IGBT 200 to be turned off, and the IGBT 240 to be turned on. In this case, a current Ib flows from the capacitor 300 through the coil 320 to the IGBT 240, as given by the dashed line in FIG. 4 as one path. Accordingly, the capacitor 300 is discharged, and the voltage Vu drops as illustrated in FIG. 5. Then, after flowing through the IGBT 240, the current Ib returns through the electrolytic capacitor 110.

As such, in response to the IGBT 240 being turned on, the current Ib flows so as to discharge the capacitor 300, and the voltage Vu drops with a slope based on the inductance value L2 of the coil 320. Note that in an embodiment of the present disclosure, the coils 310, 320 configures the transformer such that the directions and numbers of turns thereof are the same, and the inductance values thereof are equal to each other. Thus, at time t1 at which the IGBT 200 is turned off and the IGBT 240 is turned on, the currents Ia and Ib have current values equal to each other. If the coils 310, 320 do not configure the transformer, the currents Ia and Ib flow through paths other than those described above, without maintaining the connectivity of the currents Ia and Ib.

Meanwhile, since the IGBT 200 is off, the capacitor 300 is not charged and the voltage Vu does not rise.

At time t2 in FIG. 5, in response to the voltage Vu dropping in accordance with the output voltage command Vui, the control circuit 30 causes the control signal S0 to go high, the control signal S1 to go low, the IGBT 200 to be turned on, and the IGBT 240 to be turned off. Note that, as in the case at time t1, at time t2 at which the IGBT 200 is turned on and the IGBT 240 is turned off, the currents Ia and Ib have current values equal to each other. The same operation is repeated from time t2.

When the power converter circuit 40*u* operates as such and the voltage Vu is filtered by an LC low-pass filter to remove a high frequency component therefrom, the sinusoidal voltage Vu according to the output voltage command is applied to the motor 20.

The operation of the power converter circuit 40*u* has been described above with reference to FIGS. 3 to 5. However, FIGS. 3 to 5 illustrate only ideal operation without considering parasitic capacitance or parasitic inductance. In actuality, the IGBTs 200, 240 may be turned on concurrently or turned off concurrently, due to manufacturing variations in IGBTs, delay of the control signal S0, S1 caused by the influence of the wiring pattern of the inverter circuit 10 through which the control signals S0, S1 propagate, and the like. The following describes the operation of the power converter circuit 40*u* in such a case with reference to FIGS. 6 to 8

Figure 6:
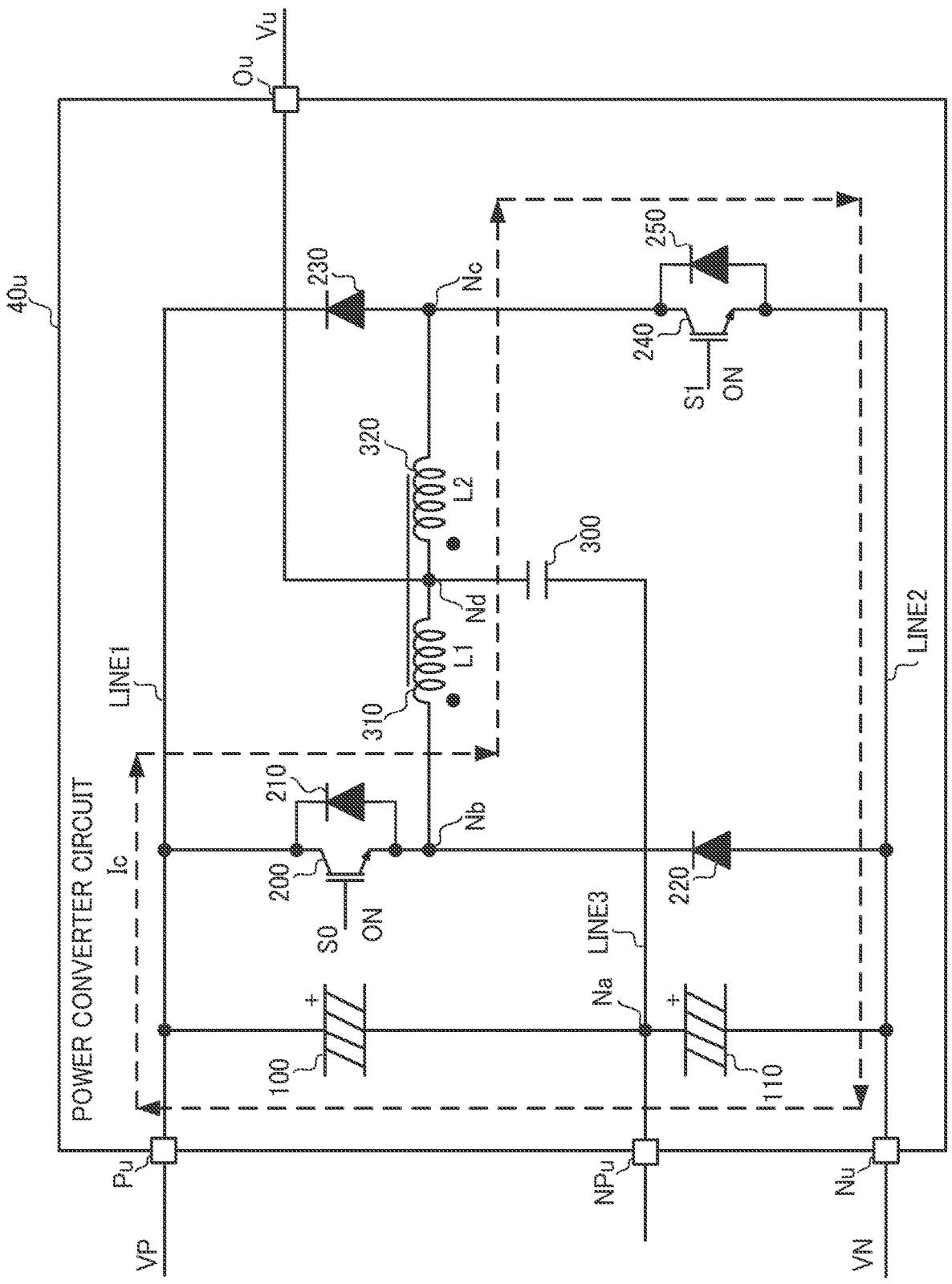
FIG. 6 is a diagram illustrating an example of a current path of a power converter circuit 40u when insulated gate bipolar transistors (IGBTs) 200, 240 are turned on concurrently.
Figure 7:
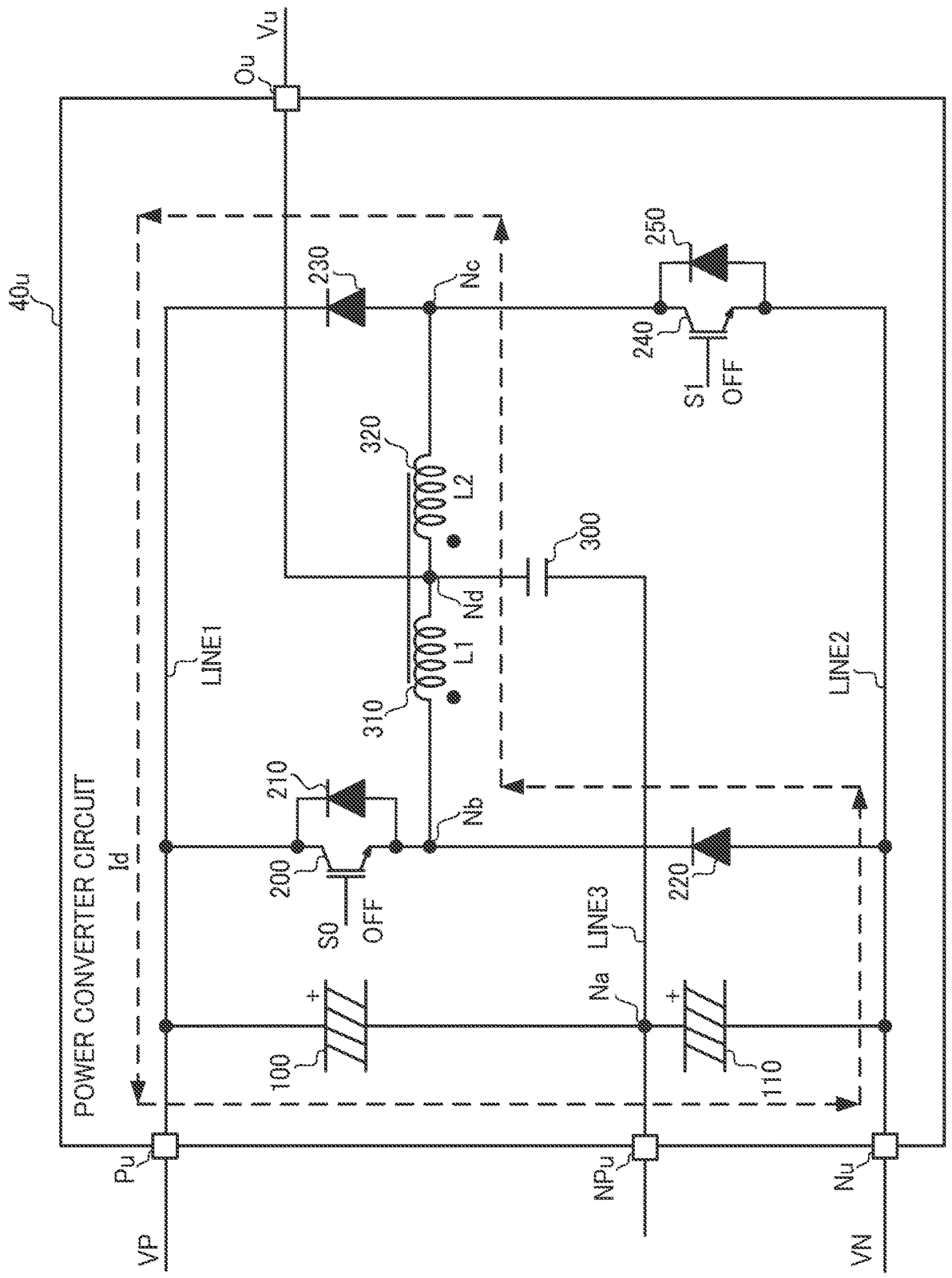
FIG. 7 is a diagram illustrating an example of a current path of a power converter circuit 40u when IGBTs 200, 240 are turned off concurrently.
Figure 8:
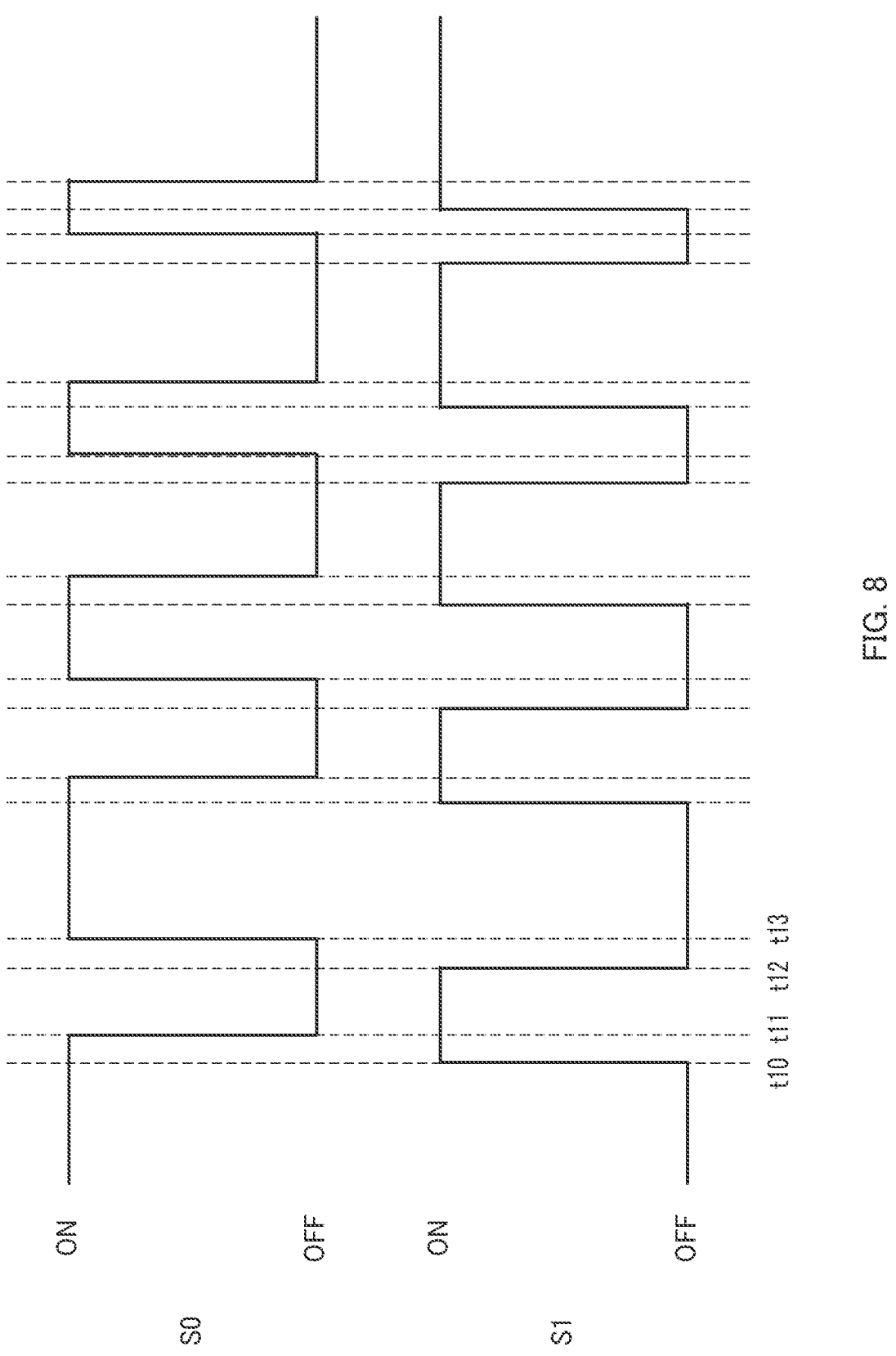
FIG. 8 is a diagram illustrating an example of control signals S0, S1 when IGBTs 200, 240 are turned on or off concurrently.

FIG. 6 is a diagram illustrating an example of a current path of the power converter circuit 40*u* when the IGBTs 200, 240 are turned on concurrently. FIG. 7 is a diagram illustrating an example of a current path of the power converter circuit 40*u* when the IGBTs 200, 240 are turned off concurrently. FIG. 8 is a diagram illustrating an example of the control signals S0, S1 when the IGBTs 200, 240 are turned on or off concurrently.

When the IGBTs 200, 240 are concurrently on as in the time period from time t10 to time t11 in FIG. 8, a current Ic flows in the power converter circuit 40*u*, as given by the dashed line in FIG. 6 as one path.

Specifically, when the IGBT 240 is turned on, the current Ic flows through the IGBT 200, the coils 310, 320, to the IGBT 240, and further flows through the electrolytic capacitors 100, 110.

Furthermore, when IGBT 240 is turned on while the IGBT 200 is on at time t10, as illustrated in FIG. 8, a short-circuit current appears to flow from the IGBT 200 to the IGBT 240.

However, before time t10, the current Ia in FIG. 3 is flowing to charge the capacitor 300, and if the IGBT 240 is turned on in this event, the coil 310 tries to continue passing the same current Ia. Then, it tries to pass the current Ic of the same current value as that of the current Ia through the coil 320 through which the current Ia has not been passed until then.

That is, the IGBT 200 is turned on, and if the IGBT 240 is turned on when the capacitor 300 is to be charged, the path of the current Ia to charge the capacitor 300 is switched to the path of the current Ic.

Further, when the IGBTs 200, 240 are instantaneously on concurrently, a coil having a large inductance appears in a current path. Thus, the short-circuit current from IGBT 200 to IGBT 240, that is, the current Ic is suppressed. Note that such an operation occurs even if the coils 310, 320 do not configure the transformer as in an embodiment of the present disclosure.

Further, at time t11, when the IGBT 200 is turned off while the IGBT 240 is on, the current Ic stops flowing through the coil 310, but the coil 310 transiently passes the current Ib in FIG. 4 having the same magnitude as that of the current Ic to the IGBT 240 through the coil 320.

Meanwhile, when the IGBTs 200, 240 are off concurrently as in the time period from time t12 to time t13 in FIG. 8, a current Id flows in the power converter circuit 40*u* as given by the dashed line in FIG. 7.

Specifically, since the IGBTs 200, 240 is off concurrently, the currents does not flow through the IGBTs 200, 240. Thus, the current Ib in FIG. 4 flowing through the coil 320 in the time period from time t11 to time t12 flows through the coil 320 as the current Id in FIG. 7, and further flows through the diode 230, the electrolytic capacitors 100, 110 to the diode 220. Then, the current Id flows from the diode 220 through the coil 310 to the coil 320.

When the IGBTs 200, 240 are concurrently off, the current Id flows in this way, such that the current Ib having been flowing through the coil 320 results in flowing through the electrolytic capacitors 100, 110 as the current Id.

The case in which the IGBTs 200, 240 are concurrently on and the case in which the IGBTs 200, 240 are concurrently off have been described with reference to FIGS. 6 to 8. As described above, even if the control signal S0, S1 is delayed, the power converter circuit 40u operates without breaking a device such as the IGBT 200, 240 or the like.

===When Using Semiconductor Module 400 in Power Converter Circuit 40u===

Figure 9:
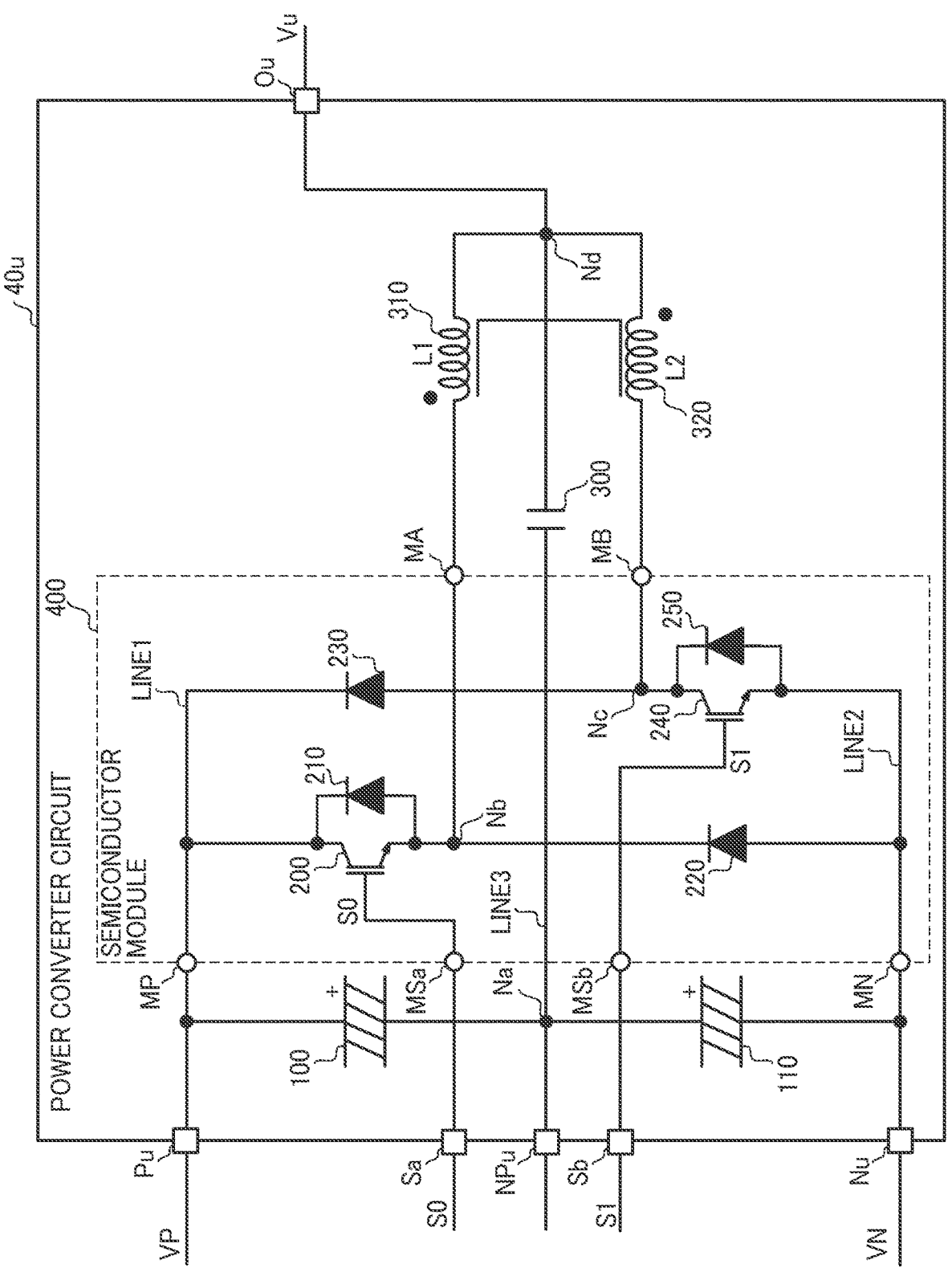
FIG. 9 is a diagram illustrating an example of a semiconductor module 400.

FIG. 9 is a diagram illustrating a configuration example of a power converter circuit 40u when a semiconductor module 400 is used therein. Further, the power converter circuit 40u has terminals Sa and Sb for receiving the control signals S0, S1, respectively. The semiconductor module 400 includes the IGBTs 200, 240 and the diode 210, 220, 230, and 250, and has terminals MP, MN, MA, MB, MSa, and MSb. The connection relationship of these elements is as in the power converter circuit 40u in FIG. 2, the coils 310, 320 are connected in series between the terminals MA and MB, and the capacitor 300 is connected to the node Nd.

Further, the line LINE1 is connected to the terminal MP of the semiconductor module 400, the line LINE2 is connected to the terminal MN, the node Nb is connected to the terminal MA, and the node Nct is connected to the terminal MB. Further, the terminal MSa is connected to the terminal Sa, and the terminal MSb is connected to the terminal Sb. Note that the terminal MP corresponds to a "first terminal", the terminal MN corresponds to a "second terminal", the terminal MA corresponds to a "third terminal", and the terminal MB corresponds to a "fourth terminal".

Further, the semiconductor module 400 has been described as having the diodes 210, 250 installed therein, however, the diodes 210, 250 may be external components of the semiconductor module 400.

Further, IGBTs 200, 240 are used in an embodiment of the present disclosure, however, if a switching device (e.g., SiC-MOSFET) in which s parasitic diode is formed is used, the parasitic diode may be used instead of the diode 210, 250.

Furthermore, instead of the IGBTs 200, 240, other devices using wide bandgap semiconductor may be used as switching devices.

===Summary===

The power supply device 10 according to an embodiment of the present disclosure has been described above. The power converter circuit 40u includes IGBTs 200, 240, the diodes 220, 230, the capacitor 300, and the coils 310, 320. The IGBT 200 and the diode 220 are connected in series, and similarly, the diode 230 and the IGBT 240 are connected in series. This prevent a through current from flowing from the line LINE1 to the line LINE2 when the IGBT 200 is turned on. Similarly, the through current does not flow from the line LINE1 to the line LINE2 when the IGBT 240 is turned on. Accordingly, even without the dead time during which the control signals S0, S1 are concurrently low, no through current flows. This makes it possible to provide the power converter circuit capable of suppressing distortion of the waveform of the output voltage.

Further, the power converter circuit 40u includes the electrolytic capacitors 100, 110, and the capacitor 300 is connected to the connection node at which the coils 310, 320 are connected and to the connection node at which the electrolytic capacitors 100, 110 are connected. This makes it possible to provide a current path when the IGBTs 200, 240 are on/off in the power converter circuit 40u. Accordingly, change in the current in the power converter circuit 40u when the IGBTs 200, 240 are switched on/off results in being smooth.

Further, the power converter circuit 40u includes the transformer that uses the coil 310 as the primary winding and the coil 320 as the secondary winding. This makes it possible to obtain connectivity of the current flowing through the node Nd when the IGBTs 200, 240 are switched on/off.

Further, the number of turns of the coil 310 is equal to the number of turns of the coil 320. This makes it easier for the current values of the currents flowing through the coils 310, 320 to be equal when the IGBTs 200, 240 are switched on/off.

Further, the use the IGBTs 200, 240 can achieve high degree of integration.

Further, the use of devices using wide bandgap semiconductor instead of the IGBTs 200, 240 can improve power conversion efficiency.

The present disclosure is directed to provision of a power converter circuit capable of restraining distortion of a waveform of an output voltage.

According to the present disclosure, it is possible to provide a power converter circuit capable of restraining distortion a waveform of an output voltage.

An embodiment of the present disclosure described above is simply to facilitate understanding of the present disclosure and is not in any way to be construed as limiting the present disclosure. The present disclosure may variously be changed or altered without departing from its essential features and encompass equivalents thereof.

What is claimed is:

1. A power converter circuit configured to output a predetermined Alternating Current (AC) voltage from a three phase AC voltage, the power converter circuit comprising:

a first line on a positive voltage side of the power converter circuit;

a second line on a negative voltage side of the power converter circuit;

a third line;

a first switching device connected to the first line;

a first diode having a cathode connected to the first switching device and an anode connected to the second line;

a second diode having a cathode connected to the first line;

a second switching device connected to an anode of the second diode and the second line;

a first coil and a second coil connected in series between a first node, at which the first switching device and the first diode are connected, and a second node, at which the second switching device and the second diode are connected; and a first capacitor having two terminals, one terminal being connected to a third node, at which the first coil and the second coil are connected, and the other terminal being connected to the third line, wherein the third line is configured to be connected to a neutral point, and the third node is configured to be connected to a load at which the predetermined AC voltage is applied.

2. The power converter circuit according to claim 1, further comprising:

a second capacitor connected to the first line; and a third capacitor connected in series with the second capacitor, the third capacitor being connected to the second line, wherein the first capacitor is connected, through the third line, to a connection node at which the second capacitor and the third capacitor are connected.

3. The power converter circuit according to claim 1, further comprising a transformer that uses a first coil as a primary winding and a second coil as a secondary winding.

4. The power converter circuit according to claim 3, wherein a number of turns of the primary winding is equal to a number of turns of the secondary winding.

5. The power converter circuit according to claim 4, wherein each of the first switching device and the second switching device is an insulated gate bipolar transistor (IGBT).

6. The power converter circuit according to claim 4, wherein each of the first switching device and the second switching device is a device using a wide bandgap semiconductor.

7. An inverter circuit comprising a plurality of power converter circuits each being the power converter circuit according to claim 1.

8. A semiconductor module for a power converter circuit outputting a predetermined Alternating Current (AC) voltage from a three phase AC voltage, the semiconductor module comprising:

a first line on a positive voltage side of the power converter circuit;

a second line on a negative voltage side of the power converter circuit;

a first switching device connected to the first line;

a first diode having a cathode connected to the first switching device and an anode connected to the second line;

a second diode having a cathode connected to the first line;

a second switching device connected to an anode of the second diode and the second line;

a first terminal to which the first line is connected, a second terminal to which the second line is connected, a third terminal to which a first node, at which the first switching device and the first diode are connected, is connected; and a fourth terminal to which a second node, at which the second switching device and the second diode are connected, is connected, wherein the third terminal and the fourth terminal are configured for a first coil and a second coil, connected in series and having a first capacitor connected to a node at which the first coil and the second coil are connected, to be connected between the third and fourth terminals, wherein the node at which the first coil and the second coil are connected is configured to be connected to a load at which the predetermined AC voltage is applied, and the first capacitor has two terminal, one of the terminals being connected to the node, and the other of the terminals being connected to a neutral point.

* * * * *